UNITED STATES PATENT OFFICE.

ALBERT G. MANNS, OF CHICAGO, ILLINOIS, ASSIGNOR, BY DIRECT AND MESNE ASSIGNMENTS, TO FOOD & FIBER PRODUCTS COMPANY, OF CHICAGO, ILLINOIS, A CORPORATION OF ILLINOIS.

FOOD EXTRACT FROM CORNSTALKS.

No. 820,806.      Specification of Letters Patent.      Patented May 15, 1906.

Application filed July 17, 1905. Serial No. 270,104.

*To all whom it may concern:*

Be it known that I, ALBERT G. MANNS, a citizen of the United States, residing at Chicago, in the county of Cook and State of Illinois, have discovered a certain new and useful Product Derived from Cornstalks, of which the following is a specification.

This invention or discovery relates to a new product derived from cured cornstalks; and it has for its direct object to secure a valuable extract which has hitherto not been recovered.

It is well known that cured cornstalks, either those which have been cut and harvested with the ears thereon or those which have remained in the field until cured, possess more or less food value as forage; but so far as I am aware it has never been proposed to so treat these cured cornstalks as to recover practically the entire constituents thereof which are soluble in hot water or steam and which constituents constitute the chief food value of the plant, and certainly it is new to so treat these cured cornstalks as to recover this food product and at the same time accomplish a long step in the direction of reducing the fiber portion of the plant to a pulp suitable for paper-making and analogous purposes.

I have discovered that by subjecting the cornstalks, either with or without the leaves, husks, &c., adhering, to a relatively long-continued boiling in water or steam an extract may be derived which has peculiar characteristics, is rich in animal-tissue-forming constituents, and possesses a high value as an animal-food in concentrated condition and in a form capable of being very readily and fully assimilated. It has of course been known that the natural juices of bagasse and sorghum can be extracted by what is known as the "diffusion" process, wherein hot water is employed for soaking out the saccharine juices; but a product derived in this manner differs from that herein described. I have discovered that by subjecting the cornstalks to a drastic cooking in boiling water or steam continued for a relatively long period of time a new and characteristic product is derived differing radically from the products heretofore known to this art. In recovering this product I place the cornstalks in their cured condition, either with or without the forage portions (the ears or grain having of course been removed) in a suitable vessel and cook them in water or steam until they have been thoroughly softened, the mass brought to a soft pulpy condition, and practically all of the water-soluble constituents therein dissolved and set free. In practice I find that this may be accomplished by boiling in an open vessel—*i. e.*, at atmospheric pressure—for a period of from three and one-half to five hours; but this time may be shortened by cooking the stalks in a closed vessel at a higher temperature—*i. e.*, in the presence of superheated steam. After this extracting process has been completed I effect the separation of the pulp from the liquor containing the constituents thus dissolved out in any suitable manner—as, for example, by expressing or by draining. In practice in order to effect economy I prefer to cook two or more batches of material in the same liquor, and I prefer to divide the cooking treatment of each batch, first cooking the batch partly in a liquor which has theretofore been used to cook a preceding batch and is therefore partly charged with the extract and completing the cooking either in fresh water or water containing a less percentage of the extract. By so conducting the extracting process I secure more perfect extraction and at the same time keep the extracting liquor down to the minimum volume necessary to effect the treatment and accordingly effect economy in the subsequent evaporation of the extract liquor.

After separating out the exhausted pulp, as before described, I concentrate the extract by evaporation, preferably concentrating until the mass reaches a solid or semisolid consistency. The evaporation is best performed by the application of heat to a closed vessel containing the liquor and which vessel is maintained at a partial vacuum. The product derived in this manner (unlike the products heretofore recovered from sugar-cane, sorghum, &c., which are high in sucrose or crystallizable sugar and contain but small percentages of glucose or inverted sugar) contains but a comparatively small percentage of crystallizable sugar or polyoses and a relatively large percentage of uncrystallizable or inverted sugar or glucose. So, also, my new product contains large percentages of protein and of materal matters, whereas in the products heretofore derived from the treatment of cane and other green plants of a similar nature there are very low percentages of mineral matters and protein. The composition of this extract is such that it can be readily concentrated to a solid condition containing only a very small percentage of moisture, and in this form, unlike molasses which cannot be dried down to a solid, it is friable, so that it may be readily granulated or comminuted. It possesses a bitterish and distinctly grain-like flavor and is only slightly sweetish to the taste. Of course, its characteristics above mentioned will vary more or less, depending upon the particular condition and kind of corn plants treated, but the above-mentioned characteristics are pronounced in any case. For example, I have determined that a ton of harvested and cured cornstalks of the common variety will yield approximately four hundred pounds of an extract containing about ten per cent. moisture, and I have found by repeated analyses that such extract contains approximately the following proportions of the several constituents—namely, moisture, ten per cent.; ash, 14.3 per cent.; insoluble matters, 7.2 per cent.; protein, (N x 6.25,) 9.8 per cent.; sucrose, 9.2 per cent. glucose, 45.8 per cent.; non-sugars, 3.7 per cent. This analysis was obtained from extract derived from unstripped stalks—i. e., those to which the leaves, &c., were adhering.

I have determined by repeated analyses that the proportion of protein is to a considerable extent governed by the proportion of leaves and other forage which is present in the mass. When the stalks have been stripped, the percentage of protein derived is lower. I have further determined that the proportion of protein present in the extract has a marked effect upon its character—that is to say, the extract containing a large percentage of protein is much more readily reduced to a friable condition and is much less hygroscopic in character, as well as more bitter in taste, than that extract which is low in protein. The extract containing the higher percentage in protein is for most purposes more valuable because it is less susceptible to deterioration by reason of its less hygroscopic character. It is more palatable as a food for cattle, and it is obviously a better proportioned food mixture. However, the extract derived from the stripped cornstalks possesses a very considerable percentage of protein, ample to make the extract of high value, and, as hereinabove pointed out, the extract has well-defined characteristics.

The presence of the relatively large percentage of mineral matters (grouped in the foregoing analysis under the term "ash") lends distinguishing characteristics to the product and contributes largely to the food value of the same. By analysis the mineral matters present in the above analyzed extract are found to be approximately as follows: carbon dioxid, 20.55 per cent.; chlorin (Cl), 2.54 per cent.; sulphur trioxid ($SO_3$), 8.26 per cent.; phosphorus pentoxid ($P_2O_5$), 6.61 per cent.; potassa ($K_2O$), 22.42 per cent.; soda ($Na_2O$), 25.47 per cent.; iron and alumina ($Fe_2O_3$ and $Al_2O_3$), trace; lime (CaO), 4.13 per cent.; magnesia (MgO), 4.11 per cent.; matter insoluble in water and acid, 5.91 per cent.

It will be noted that the percentage of phosphates is high in the foregoing analysis.

I claim as my invention—

The herein-described concentrated water extract of cornstalks, soluble in water and containing a relatively high per cent. of protein, phosphates and uncrystallizable sugar and a low per cent. of crystallizable polyoses, and characterized by being a friable solid when concentrated to contain 10 per cent. or less of water.

ALBERT G. MANNS.

Witnesses:
  FREDERICK C. GOODWIN,
  EMILIE ROSE.